United States Patent Office 2,857,592
Patented Oct. 21, 1958

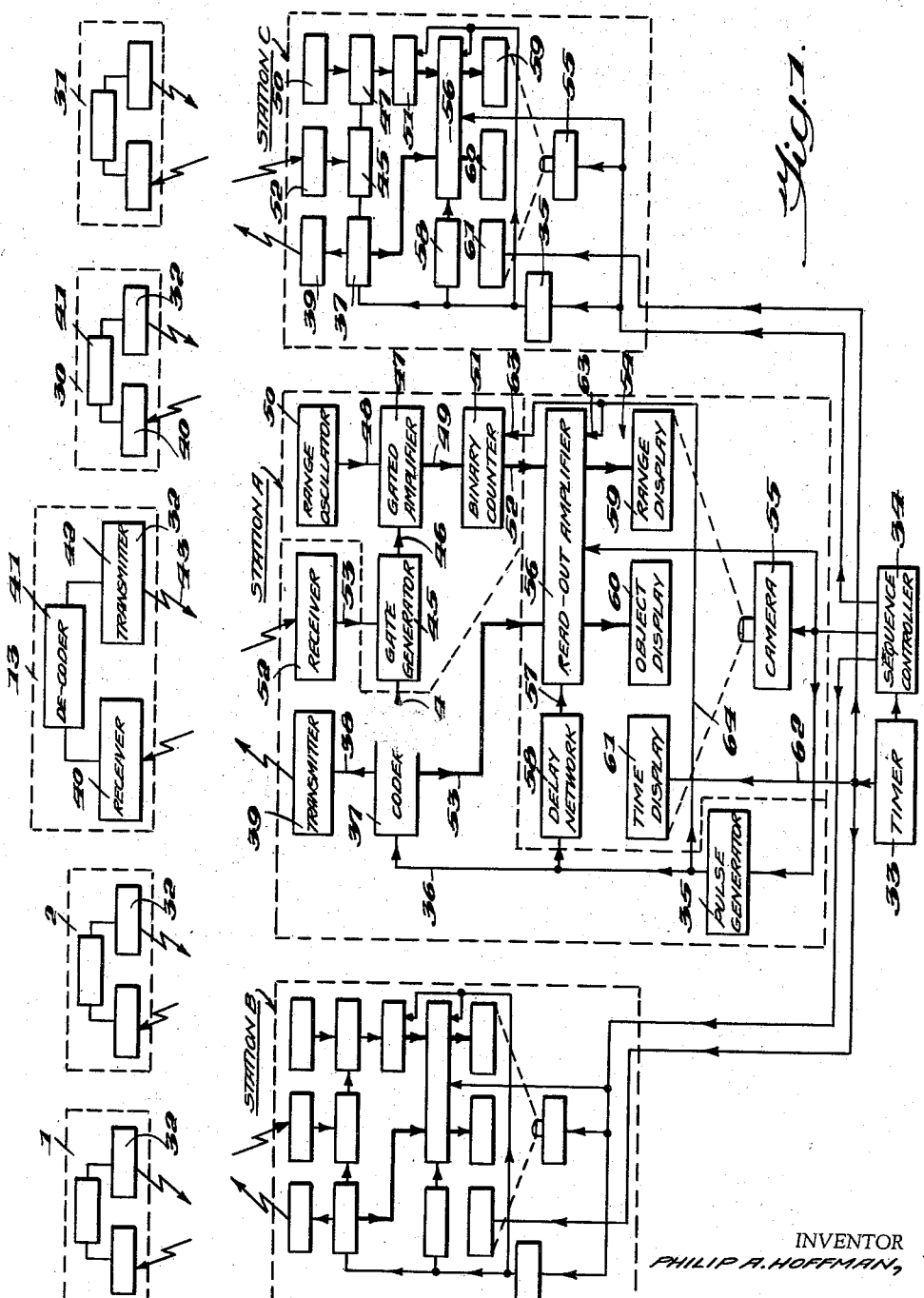

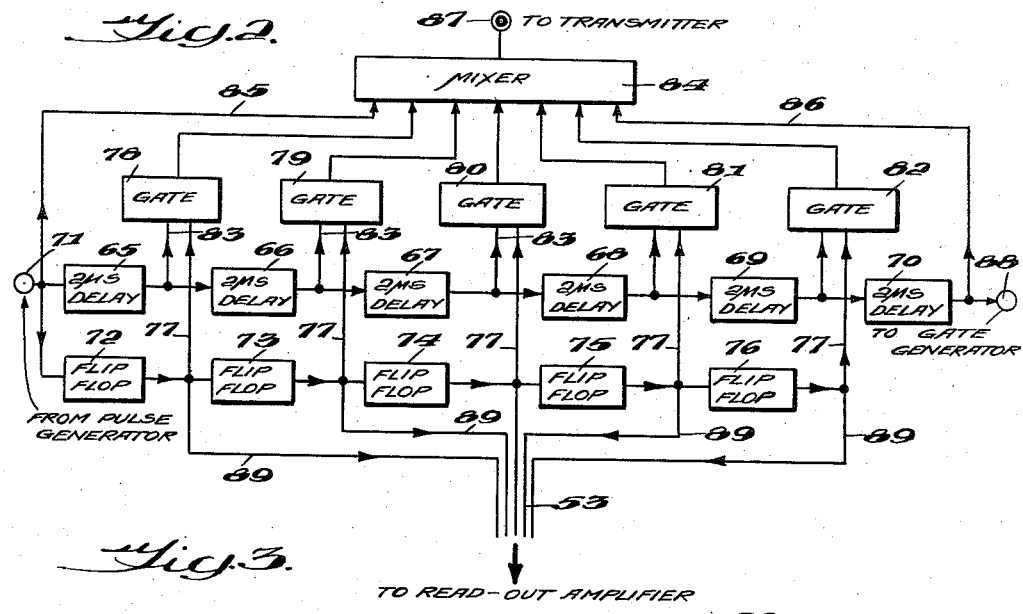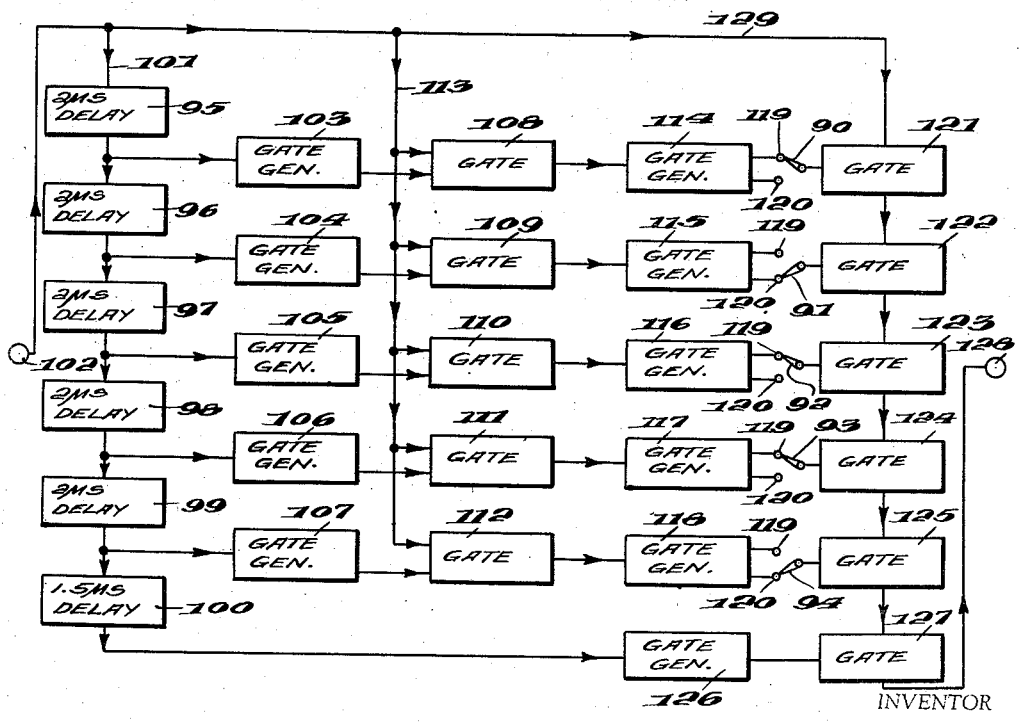

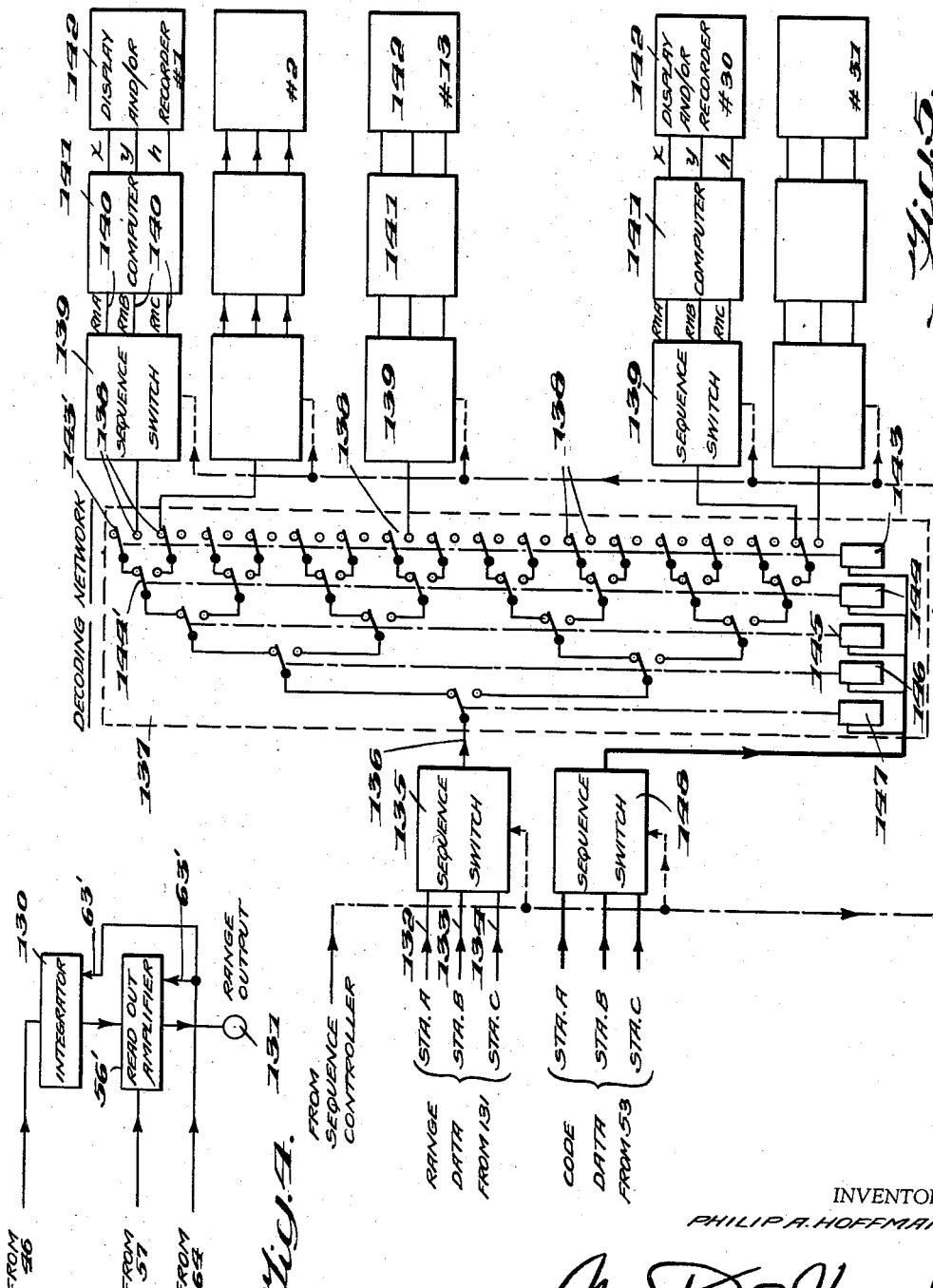

2,857,592

MULTIPLE OBJECT TRACKING SYSTEM

Philip A. Hoffman, Towson, Md., assignor to The Martin Company, a corporation of Maryland Application September 18, 1952, Serial No. 310,325

7 Claims. (Cl. 343—15)

This invention relates to apparatus for continuously tracking and recording the position of each of a plurality of airborne objects in space.

It is frequently desirable to track and record for future reference the positions of a plurality of airborne objects relative to a predetermined point on the ground. Obviously this could be done by employing a plurality of tracking radars, one for each object, each radar continuously tracking and providing azimuth, elevation and range data for its particular object. However such an arrangement becomes prohibitively expensive where more than a relatively few objects are to be tracked. Moreover the problem of designing the individual radar unit so that it will track only its one particular object, despite the presence of several other similar objects in the same general area, is extremely difficult and makes such a system impractical.

It is an object of this invention to provide a novel system for continuously tracking each of a plurality of objects in space, which requires comparatively simple and relatively inexpensive ground equipment.

A further object is to provide such a system which requires but three range-measuring radar ground stations, each of which is adapted to sequentially transmit a coded interrogating signal to each of the objects in turn, and wherein only that object interrogated will respond to the interrogating signal.

Another object is to provide such a system which is extremely flexible and wherein the range data obtained by the individual radar ranging stations may be recorded for future reference, or may, if desired, be fed into suitable computing mechanism to provide, substantially instantaneously, information as to the positions of all of the objects in terms of their rectangular coordinates with respect to a predetermined point.

Further objects will become apparent from the following description and claims, especially when considered in conjunction with the drawing.

In the drawing:

Fig. 1 is a block diagram of the novel tracking system.

Fig. 2 is a block diagram of one of the coders used in the ground stations shown in Fig. 1.

Fig. 3 is a block diagram of a decoder used in one of the airborne objects.

Fig. 4 is a block diagram of a modification of a portion of Fig. 1.

Fig. 5 is a diagram showing means for converting the range data from the ground stations into rectangular coordinates.

Figure 1 shows a plurality of airborne objects 1, 2, 13, 30 and 31 which it is desired to constantly track so that the position of any of the objects at any particular time can be quickly determined and recorded for future reference. Each of the objects includes a radar reply beacon 32 which is adapted to send out a reply pulse in response to a coded radar interrogating signal corresponding to that particular object.

Located at relatively widely spaced, known positions on the ground are a plurality of ground radar ranging stations A, B and C, each station in turn being adapted to sequentially interrogate each of the objects to determine its slant line range from that particular station. The ground stations are synchronized by means of a master timer 33 which controls a sequencer 34 so as to cause the latter to apply a suitable control or gating voltage to each of the ground stations in sequence.

Each ground station includes a pulse generator 35 which, so long as the control voltage from the sequencer is applied thereto, is adapted to generate a series of widely spaced one microsecond pulses. In the instant case assume that it is desired to track up to thirty-one objects, and that every object must be interrogated once by each of the ground stations every second. A pulse repetition rate of 100 pulses per second would be suitable for the pulse generator, with the time length of the control or gating voltage from the sequencer to any particular station being slightly greater than 0.31 second but less than 0.32 second, so that 32 pulses will be generated by the pulse generator during the operative period. This leaves a period of approximately 0.02 second out of the third of a second allotted to each station, during which period the control voltage will be interrupted and the circuits switched within the sequencer for the application of the next control or gating voltage to the next station of the sequence. The pulses from generator 35 are fed through line 36 to a coder 37 which, as will be later described, is adapted to generate a plurality of spaced pulses corresponding to the code number of the particular object that is to be interrogated. The coder also will generate an additional pulse following the code group which will be termed the Range pulse. The resulting series of pulses, including the pulse originally supplied by the generator 35 (which will be called the Start pulse), the code group, and the Range pulse, are applied as at 38 to transmitter 39 so as to cause the latter to transmit a corresponding series of pulses.

As previously mentioned, each of the airborne objects includes a radar reply beacon 32. Each beacon includes a receiver 40, a decoder 41 and a transmitter 42. As will be described in detail hereinafter, each of the decoders 41 is arranged so as to permit triggering of the associated transmitter 42 only when the interrogating pulse from the ground station transmitter 39 includes the same code number as the number of that particular object. When this condition obtains, the Range pulse received by the receiver 40 is permitted to trigger the transmitter 42 to send a reply pulse back to the interrogating station as indicated at 43.

Returning to the description of the ground station, the coder 37 also applies the Range pulse to the start terminal 44 of a gate generator 45, which in turn is connected to the control terminal 46 of a normally blocked, gated amplifier 47. Connected to the input 48 of amplifier 47 is a constant-frequency, continuously running, range oscillator 50 and connected to the output 49 is a binary counter 51. Whenever the amplifier 47 is operative, the signal from the range oscillator 50 will be passed to the binary counter 51, which will count each cycle and store the accumulated count therein. A ground station receiver 52 is connected to the Stop terminal 53 of the gate generator 45 so that reception of a reply pulse will stop the operation of the gate generator, rendering the gated amplifier 47 inoperative and therefore stopping the operation of the binary counter 51. The accumulated count stored in the binary counter will therefore be directly proportional to the elapsed time from the transmission of the Range pulse by the receiver 52 and will, therefore, be directly proportional to the range of the object from the ground station. This information will remain stored in the counter until it is reset and will be available, in binary code form, at its output 52.

Similarly, as will be later described in detail, the last code which has been generated by the coder 37 will be available at its output 53.

At a predetermined time following the generation of the particular pulse involved, and prior to the next pulse produced by the pulse generator 35, the information stored in the coder and the binary counter is applied to a suitable indicating and/or recording unit indicated as at 54. Obviously many different types of display or recording devices could be employed. For example, display panels 59 and 60 may each comprise a bank of neon lamps, one lamp for each digit position of the binary code, and arranged to flash on briefly when the corresponding lead from the coder or the counter is energized. Recording may be obtained by photographing the display panels by means of a moving picture camera 55.

To control the transfer of information from the coder and binary counter to the display panel a read-out amplifier 56 is provided. This amplifier is normally blocked and is made operative to pass information therethrough only after a triggering pulse is applied to its Start terminal 57. This control or triggering pulse may conveniently be obtained by means of a delay network 58 directly connected to the output of the pulse generator 35, the delay provided by the network 58 being such that the read-out amplifier is made operative near the end of the pulse cycle but slightly before the next pulse from the generator 35. When the amplifier 56 becomes conductive the information stored in the coder and the binary counter is applied to the appropriate display lights in the range and object display panels 59 and 60. The camera 55 will thereupon record the displayed information for future use. Preferably, to facilitate correlating the date obtained at the three stations, the display unit will also include a time display panel 61 controlled directly as at 62 from the master timer 33. The binary counter 51, and the read-out amplifier 56 are each provided with a reset terminal 63 which, when energized by a pulse, will cause the former to reset to zero and the latter to return to its inoperative condition. These reset terminals may be connected directly to the pulse generator so that the next pulse therefrom will reset these units and place them in condition for storing subsequent information. As indicated in Fig. 1, the read-out amplifier 56 and the camera 55 are controlled by the control voltage from the sequencer 34 so that they may only operate while their associated station is interrogating the various objects.

Figure 2 shows in block diagram form, the binary coder 37 incorporated in each of the ground stations. As indicated in the drawing the coder includes a series of 2-microsecond delay lines 65—70 connected at one end to input terminal 71. Also connected to the input terminal 71 is a series of electronic units 72—76 of the type known in the art as "flip-flop" units. These "flip-flop" units are connected as at 77 to the control terminals of a series of gates or gated amplifiers 78—82. The other input terminals of the gated amplifiers are connected as at 83 to the junctions between the individual delay lines 65 through 70. The arrangement is such that a pulse applied at 83 can only pass through its gate when a gating voltage is applied to the control terminal 77. The outputs from the gates 78—82 are applied directly to a common mixer 84. The input terminal 71 is likewise connected as at 85 to the mixer while the output from the final delay line 70 is also applied as at 86 to the mixer. The output from the mixer appearing at the terminal 87 is, as indicated in Fig. 1, applied to the transmitter to control its operation. The output from delay line 70, which constitutes the Range pulse, is also applied to the output terminal 88 which is connected to the gate generator 45. Conductors 89 also lead from the junctions between the "flip-flop" units to the output cable 53.

The "flip-flop" units employed are well-known electronic devices and are therefore not shown in detail. Such units ordinarily employ a pair of vacuum tubes, one of which, when conducting, will prevent the other from conducting, and so arranged that when a control or trigger pulse is applied to the input thereof, the first tube becomes non-conducting and the second one conducts. The condition will be maintained until the next pulse, which will restore the unit to its original condition. Thus every odd numbered pulse applied to its input terminal will cause the unit to change from its normal or Zero condition, with the first tube conducting, to its effective or One condition wherein the second tube conducts, while each even numbered pulse will reset the unit to its Zero condition. The voltage appearing at the output of the unit will vary between two different values, depending upon which tube is conducting. The value when the second tube is conducting constitutes the useful gating voltage, indicating that a One is registered in that particular "flip-flop." The change in voltage when the unit is restored to its Zero condition serves to trigger the next "flip-flop" unit in the series.

It can readily be seen that, with this arrangement, assuming that each of the "flip-flop" units is initally arranged so that the first tube in each is conducting, while the second is non-conducting, the first pulse applied to the input terminal 71 will reverse "flip-flop" 72 from its normal or Zero condition to its effective or One condition. The second pulse will return 72 to its Zero condition and will cause 73 to change to its One condition. The third pulse will again change 72 to its One condition while leaving 73 unaffected. The fourth pulse will reset 72 to its Zero condition which, in turn, will reset 73 to Zero and apply a trigger pulse to change 74 to its One condition, and so on. It can thus be seen that a different number in binary code form is set up by the "flip-flop" units for each input pulse. The first "flip-flop" unit 72 when in its unit condition corresponds to the number one, the second, to the number two, the third to the number four, the fourth, to number eight, and the fifth to the number sixteen.

With the arrangement shown, assuming that all units are initially in their Zero condition, each pulse will change the count by one so that, a series of code signals corresponding to the numbers one through thirty-one will be sequentially generated thereby. Thus after the thirteenth pulse has been applied to the input terminal "flip-flop" units 72, 74 and 75 will be in their One condition while units 73 and 76 will be in their Zero condition. Gating voltages will therefore appear at gating amplifiers 78, 80 and 81 rendering these amplifiers effective to pass pulses appearing at their input terminals 83. The input pulse which caused the "flip-flop" units to assume the above described conditions also passes directly to the mixer 84 and thence to the transmitter and constitutes the Start pulse. The input pulse also starts to travel along the series of delay lines and will appear at the output of delay line 65 two microseconds later. Two microseconds later it will appear at the output 66, and so on, until finally it will appear at the output of delay line 70 twelve microseconds after the Start pulse. Whether the pulse, as it appears at the output of delay lines 65 through 69, will pass to the mixer 84 depends, of course, upon whether or not the corresponding gating amplifier is conducted. In the example given, only 78, 80 and 81 are conductive and therefore, following the Start pulse, there will appear at the output of the mixer a pulse two microseconds later, another six microseconds later, another eight microseconds later and finally the Range pulse twelve microseconds later. It can readily be seen that the number thirteen now appears as a time sequence binary code signal in between the Start and Range pulses. It can also be seen that the number 13 will also be set up in binary code form on the leads 89, since only those leads connected to the outputs of units 72, 74 and 75 will be energized, and that this last mentioned condition will be maintained until the next pulse is applied to the input terminal 71.

The decoders 41 used in the airborne beacons are similar to one another and are arranged as shown in Fig. 3. They differ only in the manner in which the code selecting switches 90 through 94, incorporated therein, are set. It the example shown in Fig. 3 these switches have been set as they would be in the decoder carried by object number 13. As in the coder, the decoder includes a series of five 2-microsecond delay lines 95–99 and a final 1.5 microsecond delay line 100. Delay line 95 is connected directly by line 101 to the input terminal 102. Connected to the junction between each adjacent pair of delay lines is a series of gate generators 103—107. The outputs or gating voltages from the gate generators are applied to the control terminals of a series of normally inoperative gates or gated amplifiers 108—112 to render the latter operative while the gating voltage lasts, the other input terminals of each of these amplifiers being also connected, as by line 113, directly to the input terminal 102. The outputs from the gating amplifiers 108—112 are in turn applied to a second series of gate generators 114—118. Each of these last mentioned gate generators has a pair of output terminals 119 and 120. The arrangement is such that terminal 119 is normally de-energized and is energized only when the gate generator is operative. The other terminal 120 is reversely arranged, voltage appearing thereat when the gate generator is inoperative and disappearing while the generator is operative. The switches 90—94 select one or the other of these terminals and apply the voltage therefrom to the control terminals of the associated, normally inoperative, gating amplifiers 121—125. An additional gate generator 126 is connected to the output terminal 128. The gated amplifier 121 has its input connected as indicated at 129 to the input terminal 102. In the block diagram, the upper line of gate generators and gated amplifier constitute the "one" chain, the next lower line, the "two" chain, the next, the "four" chain, and so on.

Gate generators 103—107 are identical and may be in the form of an unbalanced, so-called "one shot," multi-vibrator of the type which, when a trigger pulse is applied to the input thereof, will generate a short, approximately 1-microsecond gate and then return to normal, being so biased that it cannot be again triggered for a relatively considerable length of time. In the instant case, these multi-vibrators would be biased so that upon being triggered by the Start pulse they will remain insensitive to other pulses until after the Range pulse has died away, some 12 microseconds later. Gate generators 114—118 and 127 are similar to generators 103—107 except that they each will be biased so as to generate a gate which will last until somewhat after the Range pulse has been applied to the gated ampliers 121—125 and 127.

The operation of the decoder is as follows. Assume that the code signal 13 in time sequence, binary form has been transmitted by the ground station, and that the decoder is set as shown, for that particular number. Gates 121, 123 and 124 will be non-conducting, while gates 122 and 125 will be conducting, since their control switches are in contact with the normally energized output terminal of their gate generators. As the initial or Start pulse travels through the series of delay lines 95—99, it will cause the gate generators 103—107 to sequentially produce a series of 1-microsecond gating pulses, spaced at 2-microsecond intervals. Thus the gate generator 103 in the "one" chain will open its gate 108 two microseconds after the Start pulse. Since there is a pulse corresponding to the digit one in the code, and since this pulse occurs also two microseconds after the Start pulse it will be permitted to pass through the gate 108 so as to trigger the gate generator 114, causing the latter to produce a gating voltage at the terminal 119.

Since switch 90 is in contact with terminal 119 this gating voltage will be applied to the gate 121 to make the latter operative. Two microseconds later the Start pulse will have passed through delay line 96 and will trigger the next gate generator 104 to open its gate 109. However, since the code does not include a pulse in the second position, corresponding to the number two, no pulse will be passed to the corresponding gate generator 115 and the latter will remain in its normal condition, with a voltage appearing at its terminal 120. Since switch 91 is in its lower position the second gate 122 will therefore remain conducting as before. Two microseconds later the Start pulse will trigger the gate generator 105 causing its gate 110 to open for substantially a microsecond. Since the input signal includes a pulse in the third code position, corresponding to the number four, this pulse will be permitted to pass through gate 110 to trigger the gate generator 116, thus causing a control voltage to appear at the terminal 119, which voltage will be applied through the switch 92 to open the gate 123. It can similarly be shown that gate generator 117 will be triggered by the "eight" pulse so as to open gate 124 while gate generator 118 will remain in its normal condition since there will be no pulse in the fifth code position, corresponding to the number sixteen. Gate 125 therefore remains conducting. Approximately 0.5 of a microsecond before the appearance of the Range pulse at the input terminal the Start pulse will appear at the output of delay line 100 and will trigger the gate generator 126 so as to open the gate 127. This will complete a circuit from input terminal 102 through line 137 and the series of gates 121—125 and 127 to the output terminal 136, so that when the Range pulse arrives at the input it can pass to the reply transmitter to trigger the latter and cause it to transmit the desired reply pulse. Delay line 100, gate generator 126 and gate 127 are necessary to insure that the entire series of code pulses will have had an opportunity to control their gates 121—125 before a pulse can go from the terminal 102 to the output terminal 128. Thus only the Range pulse is effective to control the transmitter, and then only if it has been preceded by the code signal corresponding to the switch settings for that particular object.

Note that for any other code, the decoder, with its switches set as shown, would have blocked passage of the Range pulse to the output terminal 128. If, for example, there were no "four" pulse, gate generator 116 would not be triggered and gate 123 would remain non-conducting. Similarly, if a pulse occurred in the "two" position, for example, gate generator 115 would be triggered and the terminal 120 would be de-energized thus rendering normally open gate 122, non-conducting.

The arrangement shown in Fig. 1 is especially useful where it is merely desired to rapidly record the instantaneous positions of the various objects in terms of their ranges from the ground stations so that the data can later be coordinated and interpreted as desired. However, it is frequently desirable that the range data from the three stations be rapidly and automatically converted into rectangular coordinate form so as to very quickly provide information as to the ground coordinates and elevation of each of the objects relative to a fixed point on the ground. While, by use of binary digital computers, this information could be obtained from the binary-coded range data appearing at the output 52 of the binary coder 51 in Fig. 1, for some applications, it may be preferred that the range information be first converted into a voltage proportional to the range then being measured. Fig. 4 shows a simple arrangement for providing such range data.

In Fig. 4 an integrator 130 is provided which has its input connected to the output 46 of the gate generator 45 in the ground station. The output from the integrator is connected to a read-out amplifier 56′, the output of which is applied to a range output terminal 131. Read-out amplifier 56' is controlled by the output 57 of the delay network 58 so as to pass the information standing in the integrator to the output terminal 131 at a predetermined time in each interrogating cycle. Both the integrator 130 and the read-out amplifier 56' also are provided with reset terminals 63' which are connected to the reset line 64 of Fig. 1. With this arrangement the integrator will provide at its output a voltage proportional to the time duration of the gate generated by gate generator 45, and, at the appropriate time, this voltage, which will correspond to the range of the object just interrogated, will be passed to the output terminal 131.

Terminals 131 for the three stations, A, B and C will be connected as indicated in Fig. 5 to the three input terminals 132, 133 and 134 of a sequence switch 135 adapted to be controlled by, and in synchronism with, the sequence controller 34 of Fig. 1. Switch 135 will thereby serve to connect the input terminal 132—134, corresponding to the ground station then in operation, to the input 136 of a decoding network 137 which, as will be later described, will pass the range data to the appropriate output terminal 138, of which there is one for each object, in accordance with the code number of the particular object being interrogated. From each of the output terminals 138 of the decoding network, the range data is applied to a sequence switch 139 which serves to direct it to the appropriate input terminal 140 of a computer 141, the particular input terminal depending upon which of the three ground stations is in operation at that time.

An equation of the range data for each station may be determined by simple trigonometry. To do this, assume that three mutually perpendicular axes $(x, y$ and $h)$ exist which have their point of intersection at station #1, the $x$ axis passes through station #2 and the $x, y$ plane passes through all three of the stations. This is a valid assumption as such a coordinate system may be established for any arrangement of the stations. By simple trigonometry, the range equations will be:

$$R_1^2 = x^2 + y^2 + h^2$$
$$R_2^2 = (x-x_2)^2 + y^2 + h^2$$

and $$R_3^2 = (x-x_3)^2 + (y-y_3)^2 + h^2$$

where the subscripts refer to the particular stations, the R's are ranges of the target from the stations, the subscripted $x$'s and $y$'s refer to station locations with respect to the coordinate intersection (which will be constants for any particular arrangement), and the nonsubscripted $x$'s, $y$'s, and $h$'s refer to target locations with respect to the intersection. When the above equations are solved simultaneously for $x$ and $y$, the following equations are produced:

$$x = \frac{R_1^2 - R_2^2}{2x_2} + \frac{x_2}{2}$$

and $$y = \left(\frac{x_2 - x_3}{2y_3 x_2}\right) R_1^2 + \left(\frac{x_3}{2y_3 x_2}\right) R_2^2 - \left(\frac{1}{2y_3}\right) R_3^2 - \frac{x_2 x_3 + x_3^2}{2y_3} - \frac{y_3}{2}$$

The values of $x$ and $y$ may be easily obtained by analog computer equipment. From the range equations, it is readily seen that $h = \sqrt{R_1^2 - x^2 - y^2}$. This equation may be solved by an analog computer when the above values of $x$ and $y$ which are produced by the computer are substituted, along with $R_1$, in this equation. The squaring, summing, and square rooting steps in this equation represent processes that are easily performed by analog computing techniques.

If the stations are not at the same level with respect to one another, the $x, y$ plane will not be horizontal and therefore the coordinate system will be tilted. It is a simple matter to shift the coordinate system by summer means within the computer. Likewise, if a point of reference is desired that is not one of the stations, it is a simple matter to introduce D. C. voltages in the computer which will shift the reference point. These techniques are well known in the art and means are provided in computers for performing them.

The computer 141 performs the function of simultaneously solving the three range equations to produce the rectangular coordinates of the target with respect to the reference point. Computers and techniques capable of performing this function are well known to those skilled in the art. For example, two commercially available pieces of general equipment which are capable of performing this operation by analog means are the Reac, which is manufactured by the Reeves Instrument Corp., and the Geda, which is manufactured by the Goodyear Aircraft Corp. As these are general purpose computers, many circuits found therein will not be used in this particular operation, and therefore may be eliminated in order to conserve equipment, space, weight, etc. A publication entitled "Project Cyclone Symposium 1 on Reac Techniques," Reeves Instrument Corp., under contract with Special Devices Center, discusses the Reac and the techniques employed therein.

Digital computers may also be used for this function. Several examples of digital computers that are capable of performing this function are the MIT Whirlwind and the University of Pennsylvania Eniac. As these are general purpose computers, many circuits found therein will not be used for this particular purpose and therefore may be eliminated.

While many forms of decoding networks would be useable, the unit shown in Fig. 5 for purposes of illustration comprises a plurality of fast acting relays 143 to 147, one for each digit of the binary code used to designate the individual objects. The relay 143, corresponding to the "one" code digit, carries sixteen movable switch contacts 143', relay 144, corresponding to the "two" code digit, carries eight movable contact points 144', and so on, the various contacts being interconnected as shown in the drawing. The relays 143 to 147 are controlled through a sequence switch 148 by the code data appearing at the output 53 of coder of the ground station then in operation. It can be seen that relays 143 to 147 will be actuated in accordance with the code data to connect the input terminal 136 to the proper output terminal 138. For example, if the code number 13 in binary form is applied to the relays, relay 143, relay 145 and relay 146, corresponding to the "one," "four" and "eight" digits in the code, will be energized, reversing their movable contacts and connecting the input terminal 136 to the output 138 for channel 13. Obviously, electronic switching, using vacuum tubes in place of the relays, could be employed in the decoding network where faster action was deemed desirable, without affecting the principle of operation.

The operation of the tracking system is believed to be clear from the above description of the components thereof. Assume that the stations A, B and C are made operative by the sequence controller 34 in the above order. The control gate from the sequence controller will start the pulse generator 35 of station A in operation to generate a series of thirty-two 1-microsecond, spaced pulses. These pulses will, as previously described, be applied to the coder 37 which, in turn will generate a code signal and a Range pulse which will be transmitted by the transmitter 39 as an interrogating signal to the airborne objects 1 to 31. This interrogating signal will be received by each of the airborne objects and will so actuate the decoders therein that the Range pulse will pass through to the reply transmitter 32 of that object only which corresponds to the particular code signal transmitted. The resulting reply pulse from the airborne object will be received by the receiver 52 of the ground station and, in conjunction with the range output from the coder, will actuate the range-measuring equipment. In the form shown in Fig. 1 the range will appear in the binary counter 51 as a number in binary code form.

Shortly before the next pulse from the pulse generator 35 the code information from the coder 37 and the range information from the binary counter 51 will be passed to the appropriate portions of the display panel and will be photographed by the camera 55. The cycle will be repeated until each of the airborne objects has been interrogated in turn, at which time the control voltage from the sequence controller 34 will be switched to station B, making the latter operative and returning station A to its inactive condition. Station B will thereupon successively interrogate and obtain the range of each of the airborne objects and, at the expiration of its operative period, station C will be made operative. This cycle will be repeated so that each camera will contain a continuous record of the range, at one second intervals, of each object from its particular station. The information stored in the three cameras 55 can then later be analyzed and correlated for the purpose of determining the relative position of the various objects at any time.

When it is desired to obtain the rectangular coordinates of each of the objects more quickly, the apparatus shown in Figs. 4 and 5 can be employed, either in place of the range-measuring and recording apparatus of the ground stations, shown in Fig. 1, or in addition thereto. When this additional equipment is provided the range information for any particular object relative to any one of the three ground stations will be directed by means of the sequence switches and decoding network to the appropriate input terminal 140 of the computer 141 provided for that particular object channel. As previously indicated the output from the computers in the form of the $x$, $y$ and $h$ rectangular coordinates of the object may be displayed and/or recorded in any desired manner.

The various electronic components used in the ground stations and airborne objects are well-known to those skilled in the art and no attempt has been made to show or describe in detail the specific circuitry of the individual components. While specific forms of coder and decoder have been illustrated it is obvious that other known coders or decoders and other types of coding could be substituted without in any way affecting the principle of operation of the system. However, binary coding is particularly advantageous, where, as in this case, a relatively large number of objects are involved. Moreover the capacity of the system can be doubled by merely adding one more channel to the coders and decoders and without appreciably increasing the length of time required for the code signal. This is most important where it is desired to interrogate the objects as often as is reasonably feasible in a given length of time.

Similarly various types of range-measuring equipment could be substituted for those shown without invention. Moreover, while a camera and display lights have been shown for recording and storing the desired information, various other devices such as tape recorders, etc. could obviously be substituted, such substitutions being clearly within the contemplation of this specification.

While as shown the ground stations are sequenced so that all objects are interrogated by one station before the next station comes into operation, it is obvious that this sequencing could readily be changed so that each object was interrogated successively by all three stations, before the next object was interrogated, with but minor changes in the system and without departing from the spirit and scope of the invention as defined by the appended claims.

I claim as my invention:

1. Apparatus for tracking each of a plurality of objects comprising a tracking station including a coder operative to generate in predetermined sequence a series of spaced distinctive code signals, one corresponding to each of said objects, and a range signal following each of said code signals, a transmitter controlled by said coder for transmitting said code and range signals to said objects, each of said objects including a reply transmitter and a decoding means operative in response to the reception of the individual code signal for that particular object only to cause said reply transmitter to transmit a reply signal to said tracking station having a predetermined time relationship to the reception of the corresponding range signal.

2. Apparatus for tracking each of a plurality of objects comprising a tracking station including a coder operative to generate in predetermined sequence a series of spaced distinctive code signals, one corresponding to each of said objects, and a range signal following each of said code signals, a transmitter controlled by said coder for transmitting said code and range signals to said objects, each of said objects including a reply transmitter and a decoding means operative in response to the reception of the individual code signal for that particular object only to cause said reply transmitter to transmit a reply signal to said tracking station having a predetermined time relationship to the reception of the corresponding range signal, timing means at said tracking station for determining the elapsed time between the transmission of said range pulse and reception of the reply pulse, and recording means responsive to said coder and said timing means for sequentially recording and identifying the elapsed time for each of said objects.

3. Apparatus for tracking each of a plurality of objects comprising a plurality of tracking stations having known spaced relationships to one another, master control means for rendering said stations individually operative in predetermined sequence, each station including coding means operative so long as said station is operative to generate in predetermined sequence a series of spaced, distinctive code signals, one for each of said objects, and a range signal following each code signal, and a transmitter controlled by said coding means for transmitting said code and range signals to said objects, each of said objects including a reply transmitter and a decoding means operative in response to the reception of the individual code signal for that particular object only to cause said reply transmitter to transmit a reply signal having a predetermined time relationship to the reception of the corresponding range signal, each of said tracking stations including range measuring means for measuring the time interval between the transmission of a range signal thereby and the reception of the corresponding reply signal, and means responsive to said coding means and said range-measuring means for continuously recording the positions of said objects relative to said tracking stations.

4. Apparatus for tracking each of a plurality of objects comprising a plurality of spaced range measuring radar stations, each including coding means for causing said station to transmit a repetitive series of spaced, individually coded, interrogating signals, one for each of said objects, and means for rendering said stations individually operative in a predetermined repetitive sequence whereby each object will be individually interrogated by each station at least once during a predetermined time interval, each of said objects including a reply transmitter and decoding means responsive only to reception of an interrogating signal coded for that particular object to cause said reply transmitter to transmit a reply signal, and means including range measuring means incorporated in said stations and responsive to said interrogating signals and said reply signals for determining the positions of said objects relative to said stations during said interval.

5. Apparatus for tracking each of a plurality of objects comprising at least three spaced, range-measuring radar stations, each station including coding means for causing said station to transmit a repetitive series of spaced interrogating signals, each interrogating signal including a different distinctive code signal, individual to one of said objects, and means controlling said stations for rendering them individually operative in a predetermined repetitive sequence whereby each object will be individually interrogated by each station at least once during a predetermined time interval, each of said objects including a reply transmitter and decoding means responsive only to reception of an interrogating signal coded for that particular object to cause said reply transmitter to transmit a reply signal, range measuring means incorporated in each station for measuring the time interval between the transmission of a signal by that station and the reception of a reply signal from the corresponding object to determine the range to that object, and means controlled in time relationship with said coding means for recording each code signal and the range to the corresponding object prior to the transmission of the next interrogating signal.

6. Apparatus for tracking each of a plurality of objects comprising at least three spaced range-measuring radar stations, each station including a pulse generator operative when said station is operative for generating a series of spaced control pulses, means controlled by said pulse generator for producing a repetitive series of distinctive code signals, one following each control pulse, there being one distinctive code signal for each of said objects, and a range pulse following each of said code signals, and a transmitter for transmitting said pulses and code signals to said objects, each of said objects including a reply transmitter and decoding means responsive only to the reception of the code signal for that particular object and to the associated range pulse to cause its reply transmitter to transmit a reply signal, means included in each of said ground stations for measuring the time interval between the transmission of a range pulse thereby and the reception of a reply signal thereat for measuring the range to the replying object, and means operative a predetermined time after each of said control pulses for recording the code signal and the range to the corresponding object, and means controlling said stations for rendering said stations individually operative in a predetermined repetitive sequence, whereby the range of each object from each of said stations will be determined at least once during a predetermined time interval.

7. Apparatus for tracking a plurality of objects comprising a plurality of range-measuring stations each adapted to transmit a repetitive series of individually coded interrogating signals to said objects, there being one distinctive interrogating signal for each of said objects, each object including means responsive only to reception of the correspondingly coded interrogating signal for transmitting a return signal, means for rendering said stations operative in a predetermined repetitive sequence, and means responsive to said interrogating signals and said return signals for determining the instantaneous position of each of said objects relative to said stations.

References Cited in the file of this patent

UNITED STATES PATENTS

| | | |
|---|---|---|
| 2,554,893 | Brunn | May 29, 1951 |
| 2,568,926 | Moran | Sept. 25, 1951 |
| 2,632,158 | Wallace | Mar. 17, 1953 |